US011798562B2

(12) United States Patent
Moreno et al.

(10) Patent No.: US 11,798,562 B2
(45) Date of Patent: Oct. 24, 2023

(54) ATTENTIVE SCORING FUNCTION FOR SPEAKER IDENTIFICATION

(71) Applicant: Google LLC, Mountain View, CA (US)

(72) Inventors: Ignacio Lopez Moreno, New York, NY (US); Quan Wang, Hoboken, NJ (US); Jason Pelecanos, Mountain View, CA (US); Yiling Huang, Mountain View, CA (US); Mert Saglam, Mountain View, CA (US)

(73) Assignee: Google LLC, Mountain View, CA (US)

( * ) Notice: Subject to any disclaimer, the term of this patent is extended or adjusted under 35 U.S.C. 154(b) by 173 days.

(21) Appl. No.: 17/302,926

(22) Filed: May 16, 2021

(65) Prior Publication Data

US 2022/0366914 A1    Nov. 17, 2022

(51) Int. Cl.
| | | |
|---|---|---|
| *G10L 17/06* | (2013.01) | |
| *G06N 3/08* | (2023.01) | |
| *G10L 17/04* | (2013.01) | |
| *G10L 17/18* | (2013.01) | |
| *G06F 16/245* | (2019.01) | |

(52) U.S. Cl.
CPC ............ *G10L 17/06* (2013.01); *G06F 16/245* (2019.01); *G06N 3/08* (2013.01); *G10L 17/04* (2013.01); *G10L 17/18* (2013.01)

(58) Field of Classification Search
CPC ......... G10L 17/06; G10L 17/04; G10L 17/18; G06F 16/245; G06N 3/08
See application file for complete search history.

(56) References Cited

U.S. PATENT DOCUMENTS

| | | | | |
|---|---|---|---|---|
| 10,403,291 | B2 * | 9/2019 | Moreno | G10L 17/14 |
| 10,923,111 | B1 * | 2/2021 | Fan | G10L 15/16 |
| 11,366,978 | B2 * | 6/2022 | Kim | G06F 18/2411 |
| 11,568,878 | B2 * | 1/2023 | Rikhye | G10L 17/24 |
| 2015/0039299 | A1 * | 2/2015 | Weinstein | G10L 15/16 |
| | | | | 704/202 |

(Continued)

FOREIGN PATENT DOCUMENTS

WO    WO-2021183229 A1 *  9/2021

OTHER PUBLICATIONS

Prabhavalkar, Rohit, et al. "Automatic gain control and multi-style training for robust small-footprint keyword spotting with deep neural networks." 2015 IEEE International Conference on Acoustics, Speech and Signal Processing (ICASSP). IEEE, 2015 (Year: 2015).*

(Continued)

*Primary Examiner* — Bhavesh M Mehta
*Assistant Examiner* — Nandini Subramani
(74) *Attorney, Agent, or Firm* — Honigman LLP; Brett A. Krueger; Grant J. Griffith

(57) ABSTRACT

A speaker verification method includes receiving audio data corresponding to an utterance, processing the audio data to generate a reference attentive d-vector representing voice characteristics of the utterance, the evaluation ad-vector includes $n_e$ style classes each including a respective value vector concatenated with a corresponding routing vector. The method also includes generating using a self-attention mechanism, at least one multi-condition attention score that indicates a likelihood that the evaluation ad-vector matches a respective reference ad-vector associated with a respective user. The method also includes identifying the speaker of the utterance as the respective user associated with the respective reference ad-vector based on the multi-condition attention score.

30 Claims, 6 Drawing Sheets

(56) References Cited

U.S. PATENT DOCUMENTS

| | | | |
|---|---|---|---|
| 2015/0127342 A1* | 5/2015 | Sharifi | G10L 17/18 |
| | | | 704/239 |
| 2018/0374486 A1* | 12/2018 | Zhao | G10L 17/22 |
| 2019/0130918 A1 | 5/2019 | Wu et al. | |
| 2020/0111496 A1* | 4/2020 | Itakura | G06N 3/04 |

OTHER PUBLICATIONS

Jul. 27, 2022 Written Opinion (WO) of the International Searching Authority (ISA) and International Search Report (ISR) issued in International Application No. PCT/US2022/072139.

Daniel Garcia-Romero et al: "Multicondition training of Gaussian PLDA models in 1-vector space for noise and reverberation robust speaker recognition", 2012 IEEE International Conference on Acoustics, Speech and Signal Processing (ICASSP 2012): Kyoto, Japan, Mar. 25-30, 2012 ; [Proceedings], IEEE, Piscataway, NJ, Mar. 25, 2012 (Mar. 25, 2012), pp. 4257-4260.

Xuankai Chang et al., End-to-end multi-speaker speech recognition with transformer, <https://drive.google.com/file/d/1i1kKJUuTqs8VX4rzbvhllRTxGHyqLf3T/view?usp=sharing>, Dated Feb. 13, 2020.

Jeeweon Jung et al., D-vector based speaker verification system using Raw Waveform, <https://drive.google.com/file/d/19HS-sZOINc0BI_O2Oa9GEuieKXFAxZAI/view?usp=sharing>, dated Jan. 2018.

Lantian Li et al., Phonetic-attention scoring for deep speaker features in speaker verification, <https://arxiv.org/pdf/1811.03255.pdf>, dated Nov. 8, 2018.

* cited by examiner

ATTENTIVE SCORING FUNCTION FOR SPEAKER IDENTIFICATION

TECHNICAL FIELD

This disclosure relates to an attentive scoring function for speaker identification

BACKGROUND

In a speech-enabled environment, such as a home or automobile, a user may access information and/or control various functions using voice input. The information and/or functions may be personalized for a given user. It may therefore be advantageous to identify a given speaker from among a group of speakers associated with the speech-enabled environment.

Speaker identification (e.g., speaker verification and voice authentication) provides an easy way for a user of a user device to gain access to the user device. Speaker identification allows the user to unlock, and access, the user's device by speaking an utterance without requiring the user manually enter (e.g., via typing or speaking) a passcode to gain access to the user device. Speaker verification also allows a digital assistant to identify authorized users from spoken utterances without requiring the users to provide authorization credentials

SUMMARY

One aspect of the present disclosure provides a computer-implemented method for speaker identification that when executed on data processing hardware causes the data processing to perform operations that include receiving audio data corresponding to an utterance captured by a user device and processing, using a speaker identification model, the audio data to generate an evaluation attentive d-vector (ad-vector) representing voice characteristics of the utterance. The evaluation ad-vector includes $n_e$ style classes each including a respective value vector concatenated with a corresponding routing vector. The operations also include generating, using a self-attention mechanism, at least one multi-condition attention score that indicates a likelihood that the evaluation ad-vector matches a respective reference ad-vector associated with a respective user, and identifying the speaker of the utterance as the respective user associated with the respective reference ad-vector based on the multi-condition attention score. The reference ad-vector includes $n_r$ style classes each including a respective value vector concatenated with a corresponding routing vector.

Implementations of the disclosure may include one or more of the following optional features. In some implementations, identifying the speaker of the utterance includes determining whether the multi-condition attention score satisfies a threshold score, and when the multi-condition attention score satisfies the threshold score, determining that the speaker of the utterance includes the respective user associated with the respective reference ad-vector. Each value vector may include a same first dimensionality and each routing vector may include a same second dimensionality that is less than the first dimensionality of each value vector. As such, a size of the second dimensionality may be one-third a size of the first dimensionality.

In some examples, the respective value vector of each style class of the n style classes in each one of the evaluation ad-vector and the reference ad-vector contains respective speaker-related information, while the respective routing vector of each style class of the n style classes in each one of the evaluation ad-vector and the reference ad-vector contains channel and/or context information associated with a respective utterance the one of the evaluation ad-vector or the reference ad-vector was extracted from. Additionally or alternatively, the routing vectors in the evaluation and reference ad-vectors may be configured to identify matching conditions between the utterance associated with the evaluation ad-vector and at least one reference utterance associated with the reference ad-vector.

In some additional implementations, generating the at least one multi-condition attention score includes using the self-attention mechanisms to generate multiple multi-condition attention scores each indicating a respective likelihood that the evaluation ad-vector matches a respective one of multiple reference ad-vectors, while identifying the speaker of the utterance includes identifying the speaker of the utterance as the respective enrolled user of the user device that is associated with the respective reference ad-vector corresponding to the greatest multi-condition attention score. Each reference ad-vector is associated with a respective one of one or more enrolled users of the user device. In these additional implementations, the utterance captured by the user device may include a query specifying an action to perform, each of the one or more different enrolled users of the user device may have permissions for accessing a different respective set of personal resources, and performance of the action specified by the query may require access to the respective set of personal resources associated with the respective enrolled user identified as the speaker of the utterance.

The speaker identification model may include a neural network having an input layer, a plurality of hidden layers, and an output layer including multiple sets of output nodes. Each set of output nodes in the multiple sets of output nodes of the output layer is designated to learn to generate speaker-related information specific to a respective one of the n style classes. Here, processing the audio data to generate the evaluation ad-vector may include using the neural network to process the audio data to generate each of the n style classes for the evaluation ad-vector as output from the respective set of output nodes of the output layer that is designated to learn to generate the speaker-related information specific to the respective style class.

In some examples, processing the audio data to generate the reference ad-vector includes: generating, as output from the speaker identification model including a neural network, a non-attentive d-vector representing voice characteristics of the utterance; and applying a set of linear and non-linear transformations to transform the non-attentive d-vector into the reference ad-vector. The reference ad-vector may be generated by the speaker identification model in response to receiving one or more previous utterances spoken by the respective user. At least one style class of the $n_r$ and $n_e$ style classes may be dependent on a fixed term or phrase. Furthermore, the data processing hardware may execute both the speaker identification model and the self-attention mechanism, while residing on one of the user device or a distributed computing system in communication with the user device via a network.

In some implementations, the reference ad-vector is generated by: receiving, as input to the speaker identification model, m enrollment utterances spoken by the respective user; for each enrollment utterance of the m enrollment utterances, generating, as output from the speaker identification model, a respective enrollment ad-vector having $n_e$ style classes; and combining a superset of the $n_e$ style classes of the enrollment ad-vectors generated as output from the speaker identification model for the m enrollment utterances into the reference ad-vector. In these implementations, when generating the at least one multi-condition attention score that indicates the likelihood that the evaluation ad-vector matches the respective reference ad-vector associated with the respective user, the self-attention mechanism may automatically align the style classes among the evaluation ad-vector and the multiple reference ad-vectors.

Another aspect of the disclosure provides a system for speaker identification. The system includes data processing hardware and memory hardware in communication with the data processing hardware. The memory hardware stores instructions that when executed on the data processing hardware cause the data processing hardware to perform operations. The operations include receiving audio data corresponding to an utterance captured by a user device and processing, using a speaker identification model, the audio data to generate an evaluation attentive d-vector (ad-vector) representing voice characteristics of the utterance. The evaluation ad-vector includes $n_e$ style classes each including a respective value vector concatenated with a corresponding routing vector. The operations also include generating, using a self-attention mechanism, at least one multi-condition attention score that indicates a likelihood that the evaluation ad-vector matches a respective reference ad-vector associated with a respective user, and identifying the speaker of the utterance as the respective user associated with the respective reference ad-vector based on the multi-condition attention score. The reference ad-vector includes $n_r$ style classes each including a respective value vector concatenated with a corresponding routing vector.

This aspect may include one or more of the following optional features. In some implementations, identifying the speaker of the utterance includes determining whether the multi-condition attention score satisfies a threshold score, and when the multi-condition attention score satisfies the threshold score, determining that the speaker of the utterance includes the respective user associated with the respective reference ad-vector. Each value vector may include a same first dimensionality and each routing vector may include a same second dimensionality that is less than the first dimensionality of each value vector. As such, a size of the second dimensionality may be one-third a size of the first dimensionality.

In some examples, the respective value vector of each style class of the n style classes in each one of the evaluation ad-vector and the reference ad-vector contains respective speaker-related information, while the respective routing vector of each style class of the n style classes in each one of the evaluation ad-vector and the reference ad-vector contains channel and/or context information associated with a respective utterance the one of the evaluation ad-vector or the reference ad-vector was extracted from. Additionally or alternatively, the routing vectors in the evaluation and reference ad-vectors may be configured to identify matching conditions between the utterance associated with the evaluation ad-vector and at least one reference utterance associated with the reference ad-vector.

In some additional implementations, generating the at least one multi-condition attention score includes using the self-attention mechanisms to generate multiple multi-condition attention scores each indicating a respective likelihood that the evaluation ad-vector matches a respective one of multiple reference ad-vectors, while identifying the speaker of the utterance includes identifying the speaker of the utterance as the respective enrolled user of the user device that is associated with the respective reference ad-vector corresponding to the greatest multi-condition attention score. Each reference ad-vector is associated with a respective one of one or more enrolled users of the user device. In these additional implementations, the utterance captured by the user device may include a query specifying an action to perform, each of the one or more different enrolled users of the user device may have permissions for accessing a different respective set of personal resources, and performance of the action specified by the query may require access to the respective set of personal resources associated with the respective enrolled user identified as the speaker of the utterance.

The speaker identification model may include a neural network having an input layer, a plurality of hidden layers, and an output layer including multiple sets of output nodes. Each set of output nodes in the multiple sets of output nodes of the output layer is designated to learn to generate speaker-related information specific to a respective one of the n style classes. Here, processing the audio data to generate the evaluation ad-vector may include using the neural network to process the audio data to generate each of the n style classes for the evaluation ad-vector as output from the respective set of output nodes of the output layer that is designated to learn to generate the speaker-related information specific to the respective style class.

In some examples, processing the audio data to generate the reference ad-vector includes: generating, as output from the speaker identification model including a neural network, a non-attentive d-vector representing voice characteristics of the utterance; and applying a set of linear and non-linear transformations to transform the non-attentive d-vector into the reference ad-vector. The reference ad-vector may be generated by the speaker identification model in response to receiving one or more previous utterances spoken by the respective user. At least one style class of the $n_r$ and $n_e$ style classes may be dependent on a fixed term or phrase. Furthermore, the data processing hardware may execute both the speaker identification model and the self-attention mechanism, while residing on one of the user device or a distributed computing system in communication with the user device via a network.

In some implementations, the reference ad-vector is generated by: receiving, as input to the speaker identification model, m enrollment utterances spoken by the respective user; for each enrollment utterance of the m enrollment utterances, generating, as output from the speaker identification model, a respective enrollment ad-vector having $n_e$ style classes; and combining a superset of the $n_e$ style classes of the enrollment ad-vectors generated as output from the speaker identification model for the m enrollment utterances into the reference ad-vector. In these implementations, when generating the at least one multi-condition attention score that indicates the likelihood that the evaluation ad-vector matches the respective reference ad-vector associated with the respective user, the self-attention mechanism may automatically align the style classes among the evaluation ad-vector and the multiple reference ad-vectors.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
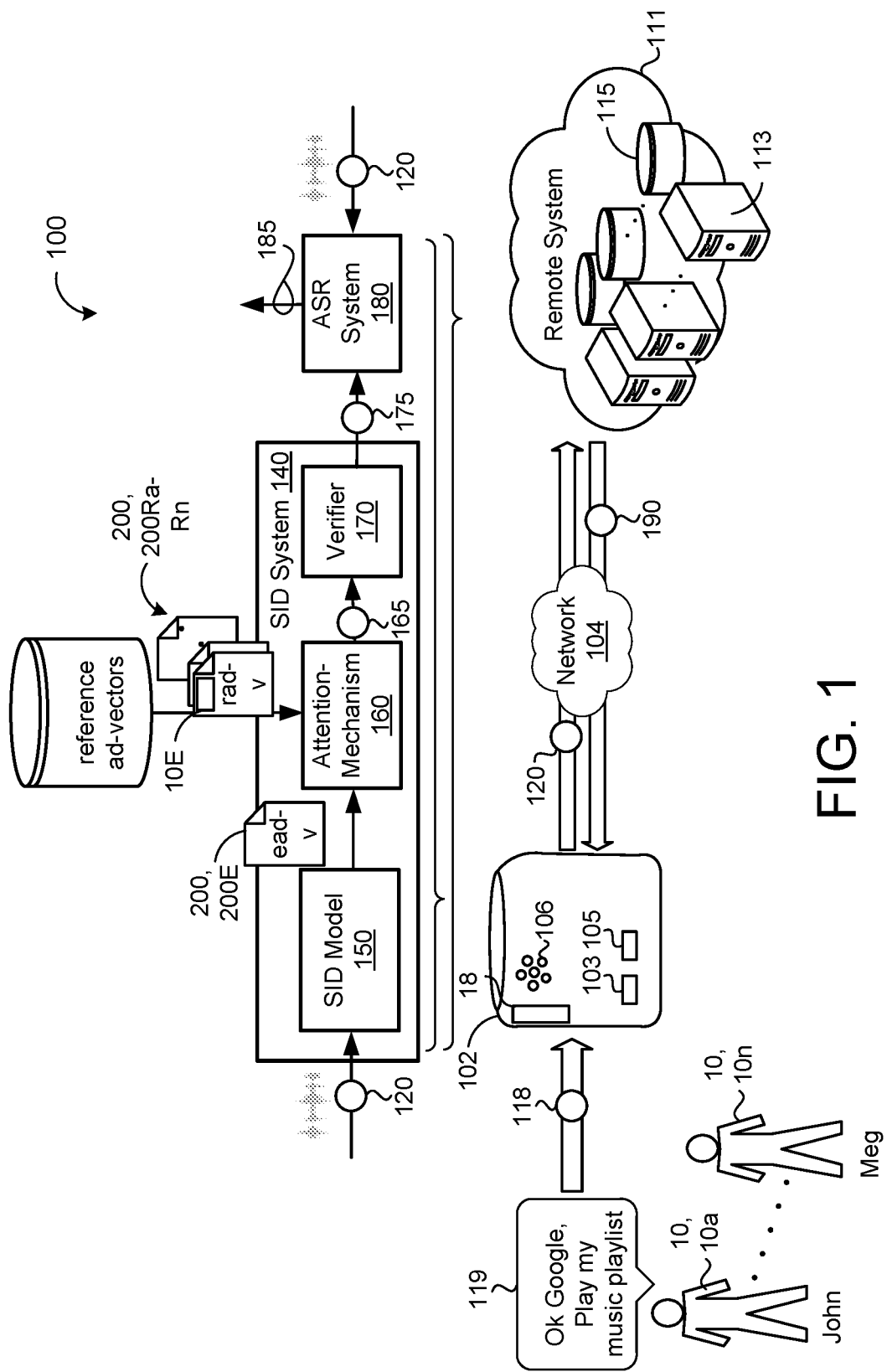
FIG. 1 is a schematic view of an example speech environment having a speaker identification system that applies an attentive scoring function for identifying a speaker.

In a speech-enabled environment, such as a home, automobile, workplace, or school, a user may speak a query or command and a digital assistant may answer the query and/or cause the command to be performed. Such a speech-enabled environment may be implemented using a network of connected microphone devices distributed through various rooms or areas of the environment. Through the network of microphones, a user can query the digital assistant through a spoken utterance without having to have a computer or other interface in front of them. In some instances, the speech-enabled environment is associated with multiple enrolled users, e.g., people who live in a household. These instances may apply when a single device is shared by multiple users such as a smart phone, smart speaker, smart display, tablet device, smart television, smart appliance, vehicle infotainment system, etc. Here, the speech-enabled environment may have a limited number of users, e.g., between two and six people in a speech-enabled home, office, or automobile. As such, it is desirable to determine an identity of a particular user that is speaking the query. The process of determining the identities of particular speakers/users may be referred to as speaker verification, speaker recognition, speaker identification, or voice recognition.

Speaker verification/identification may allow a user to issue queries that act on behalf of the particular user and/or trigger personalized responses in multi-user environments. Speaker verification/identification (e.g., voice authentication) provides an easy way for a user of a user device to gain access to the user device. For instance, a user may unlock and access the user device by speaking an utterance without requiring the user to manually enter (e.g., via typing or speaking) a passcode to gain access to the user device.

In some scenarios, a user queries the digital assistant that relates to personal information of the user and/or requires access to a resource from a set of personal resources associated with the user. For instance, a particular user (e.g., one who is enrolled with the digital assistant) might ask the digital assistant "when is my meeting with Matt" or query the digital assistant "play my music playlist". Here, the user may be one of one or more multiple enrolled users who each have permission to access their own respective set of personal resources (e.g., calendar, music player, email, messaging, contact list, etc.) and are restricted from accessing the personal resources of the other enrolled users. For instance, if John and Meg are both enrolled users of the digital assistant, the digital assistant would need to discern whether John or Meg spoke the utterance "when is my meeting with Matt" in order to access the appropriate enrolled user's calendar to determine when a meeting is scheduled with Matt and respond with meeting details for the scheduled meeting with Matt. Similarly, the digital assistant would need to discern which one of John or Meg spoke the utterance "play my music playlist" in order to access a music player and ultimately audibly output tracks from the appropriate music playlist since John and Meg have unique music playlists.

To determine which user is speaking in a multiuser, speech-enabled environment, speech-enabled systems may include speaker identification systems (e.g., speaker verification systems or voice authentication systems). A speaker verification system may employ a speaker identification (SID) model trained to extract an evaluation vector from audio data corresponding an utterance spoken by a particular user, whereby the extracted evaluation vector represents voice characteristics of the particular user. The evaluation vector may include a d-vector. The SID model may be a neural network model trained under machine or human supervision to output d-vectors. To resolve the identity of the particular user, a comparer determines whether the evaluation vector matches any reference vectors for enrolled and/or authorized users of the user device. Here, each reference vector may correspond to a voiceprint or unique identifier representing characteristics of the voice of the respective enrolled/authorized user. Each enrolled and/or authorized user may speak multiple enrollment utterances, and for each enrollment phrase, the SID model may generate a corresponding reference d-vector that may be combined, e.g., averaged or otherwise accumulated, to form the respective reference d-vector for the enrolled/authorized user.

A conventional technique for determining whether an evaluation d-vector matches a reference d-vector includes computing a cosine similarity score that represents a cosine distance between the evaluation and reference d-vectors. When computing cosine similarity scores the reference d-vector is not conditioned on the evaluation d-vector. Moreover, since the reference d-vector includes an average d-vector based on a combination of multiple enrollment utterances, useful speaker-related information may be lost during the combination.

To address some of the aforementioned shortcomings with using conventional d-vectors for speaker identification tasks, implementations herein are directed toward extracting an evaluation attentive d-vector (ad-vector) to represent voice characteristics of a captured utterance and leveraging a soft-attention mechanism to apply an attentive scoring function that computes a multi-condition attentive score (MCAS) between the evaluation ad-vector and a reference ad-vector associated with a respective authorized/enrolled user. Similar to cosine similarity scores, the MCAS indicates a likelihood that the evaluation ad-vector matches the reference ad-vector associated with the authorized/enrolled user. For instance, the MCAS score may range from −1.0 to 1.0 where an MCAS equal to 1.0 is indicative of a perfect match between the evaluation and reference ad-vectors. However, by contrast to conventional techniques that compute cosine similarity scores between evaluation and reference d-vectors, the soft attention mechanism conditions the reference ad-vector to the evaluation ad-vector when computing the MCAS in a similar way that Transformers condition weights to network inputs. Moreover, the soft attention mechanism may further condition a concatenation reference ad-vectors extracted from multiple enrollment utterances to the evaluation ad-vector when computing the MCAS score such that useful speaker-related information contained in each of the reference ad-vectors is preserved when computing the MCAS for identifying the speaker of the utterance.

Described in greater detail below, an ad-vector includes n style classes that each include a respective value vector concatenated with a corresponding routing vector. The value vector of each style class may represent different speaker related information than the speaker related information represented by the value vectors of the other style classes in each ad-vector. The routing vectors may convey environmental/channel and/or contextual information associated with audio data that corresponds to the utterance the ad-vector was generated from. The routing vectors permit the soft-attention mechanism to identify matching conditions between the evaluation and reference ad-vectors. As will become apparent, the respective routing vector is specific to its style class and weights how important the respective value vector is for the style class when the attention mechanism computes the MCAS. That is, the routing vectors enable the attention mechanism to automatically align the style classes among the evaluation and reference ad-vectors.

In speaker identification systems, it is desirable to condition a user profile and scoring between evaluation and reference speaker vectors to attributes from the utterances the speaker vectors were derived from such as audio length, near-vs-far field audio, noise conditions, and other attributes that may be helpful. In conventional speaker identification systems that perform speaker identification via cosine similarity scores between evaluation and reference d-vectors, the aforementioned attributes may be modeled by pre-defining a set of context classes passed as a side input to the speaker identification model. However, this technique requires pre-defined granularity that may result in the propagation of many problems rendering the technique infeasible at scale. For instance, the pre-defined granularity may require using extra enrollment utterances to cover all the different context classes, managing multiple profiles, and mapping each evaluation utterance to the appropriate context class. Notably, the use of the ad-vectors and attentive scoring function applied by the soft-attention mechanism described herein addresses these issues by effectively learning context classes that represent the desirable attributes without ever predefining the context classes. That is, the number n of style classes learned and represented by an ad-vector may be specified as a hyper parameter such that the style classes are data driven and not manually defined. Each context class may be learned during training of the SID model such that each context class is represented by a respective one of the n style classes. The routing vectors specific to the n style classes permit the soft-attention mechanism to automatically align the style classes among the evaluation and reference ad-vectors.

Referring to FIG. 1, in some implementations, an example speech-enabled environment includes a user device 102 associated with one or more users 10 and in communication with a remote system 111 via a network 104. The user device 102 may correspond to a computing device, such as a mobile phone, computer (laptop or desktop), tablet, smart speaker/display, smart appliance, smart headphones, wearable, vehicle infotainment system, etc., and is equipped with data processing hardware 103 and memory hardware 107. The user device 102 includes or is in communication with one or more microphones 106 for capturing utterances from the respective user 10. The remote system 111 may be a single computer, multiple computers, or a distributed system (e.g., a cloud environment) having scalable/elastic computing resources 113 (e.g., data processing hardware) and/or storage resources 115 (e.g., memory hardware).

The user device 102 may include hotword detector (not shown) configured to detect the presence of a hotword in streaming audio 118 without performing semantic analysis or speech recognition processing on the streaming audio 118. The user device 102 may include an acoustic feature extractor (not shown) which may be implemented as part of the hotword detector or as a separate component for extracting audio data 120 from utterances 119. For instance, the acoustic feature extractor may receive streaming audio 118 captured by the one or more microphones 106 of the user device 102 that corresponds to an utterance 119 spoken by the user 10 and extract the audio data 120. The audio data 120 may include acoustic features such as Mel-frequency cepstrum coefficients (MFCCs) or filter bank energies computed over windows of an audio signal. In the example shown, the utterance 119 spoken by the user 10 includes "Ok Google, Play my music playlist".

The hotword detector may receive the audio data 120 to determine whether the utterance 119 includes a particular hotword (e.g., Ok Google) spoken by the user 10. That is, the hotword detector 110 may be trained to detect the presence of the hotword (e.g., Ok Google) or one or more variants of the hotword (e.g., Hey Google) in the audio data 120 to cause the user device 102 to wake-up from a sleep state or hibernation state and trigger an automated speech recognition (ASR) system 180 to perform speech recognition on the hotword and/or one or more other terms that follow the hotword, e.g., a voice query that follows the hotword and specified an action to perform. In the example shown, the query following the hotword in utterance 119 captured in the streaming audio includes "Play my music playlist" that specifies an action for the digital assistant to access a music playlist associated with a particular user (e.g., John) 10a and provide a response 190 including an audio track from John's music playlist for the user device 10 (and/or one or more designated audio output devices) to playback for audible output from a speaker. Hotwords may be useful for "always on" systems that may potentially pick up sounds that are not directed toward the speech-enabled user device 102. For example, the use of hotwords may help the device 102 discern when a given utterance 119 is directed at the device 102, as opposed to an utterance that is directed to another individual present in the environment or a background utterance.

The speech-enabled environment 100 includes a speaker identification (SID) system 140 that is configured to determine an identity of the user 10 that is speaking the utterance 119 by processing the audio data 120. The SID system 200 may determine whether the identified user 10 is an authorized user such that the query is only fulfilled (e.g., the action specified by the query is performed) if the user is identified as an authorized user. Advantageously, the SID system 140 allows the user to unlock and access the user's device 102 by speaking the utterance without requiring the user to manually enter (e.g., via typing) or speak a passcode or provide some other means of verification (e.g., answer a challenge question, provide biometric verification data, etc.) to gain access to the user device 102.

In some examples, the speech-enabled environment 100 includes a multi-user, speech-enabled environment in which multiple different users 10, 10a-n are each enrolled with the user device 102 and have permission to access a respective set of personal resources (e.g., calendar, music player, email, messaging, contact list, etc.) associated with that user. Enrolled users 10 are restricted from accessing personal resources from the respective sets of personal resources associated with the other enrolled users. Each enrolled user 10 may have a respective user profile that links to the respective set of personal resources associated with that user, as well as other pertinent information (e.g., user-specified preference settings) associated with that user 10. Accordingly, the SID system 140 may be used to determine which user is speaking the utterance 119 in the multiuser, speech-enabled environment 100. For instance, in the example shown, John and Meg may both be enrolled users 10 of the user device 102 (or digital assistant interface running on the user device), and the digital assistant needs to discern whether John or Meg spoke the utterance 119 "Ok Google, Play my music playlist" in order to access a music player and ultimately audibly output tracks from the appropriate music playlist since Meg and John may each have unique music playlists. Here, the SID system 140 processes the audio data 120 corresponding to the utterance 119 to identify that John was the speaker of the utterance 119.

In the example shown, the SID system 140 includes a SID model 150, a self-attention mechanism 160, and a verifier 170. The SID model 150 may process audio data 120 to generate an attentive d-vector 200. For instance, the SID 150 may receive, as input, the audio data 120 corresponding to the utterance 119 and generate, as output, an evaluation ad-vector 200, 200E that represents the voice characteristics of the utterance 119 captured by the user device 119. The soft-attention mechanism 160 is configured to apply an attentive scoring function that computes one or more multi-condition attentive scores (MCAS) 165 each indicating a likelihood that the evaluation ad-vector 200E matches a respective one of one or more reference ad-vectors 200, 200R$a$-R$n$. Here, each reference ad-vector 200R is associated with a respective one of the one or more enrolled users 10 of the user device 102.

Figure 2A:
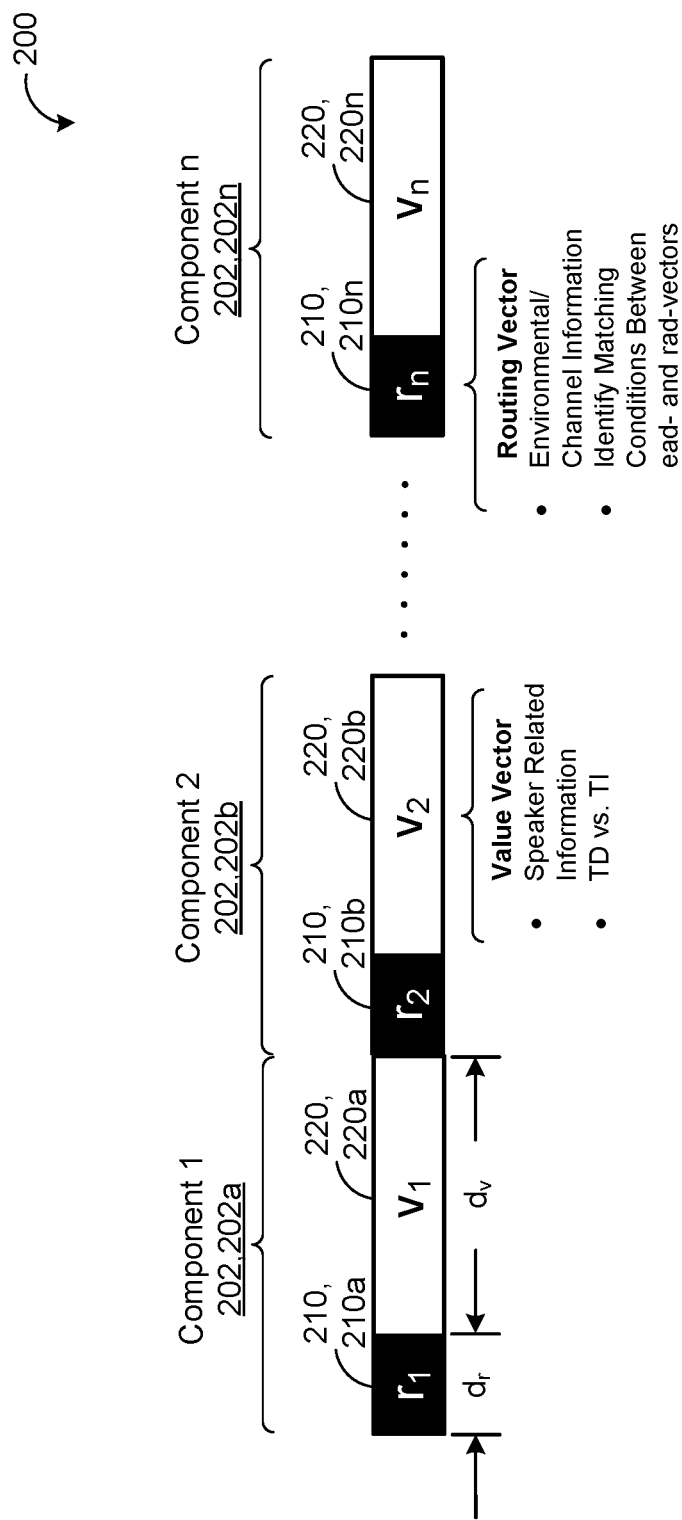
FIG. 2A is a schematic view of an attentive d-vector having n style classes concatenated with one another.

FIG. 2A shows an example ad-vector 200 that includes n style classes 202, 202$a$-$n$ each including a respective value vector ($V_1$-$V_n$) 220, 220$a$-$n$ concatenated with a corresponding routing vector ($R_1$-$R_n$) 210, 210$a$-$n$. Each value vector 220 includes a same first dimensionality $d_v$ and each routing vector 210 includes a same second dimensionality $d_r$ that is less than the first dimensionality $d_v$ of each value vector 220. In some examples, a size of the second dimensionality $d_r$ is one-third (⅓) a size of the first dimensionality $d_v$.

For reference (enrollment) ad-vectors 200R, the routing vectors 210 correspond to keys, $n_e$ denotes the number of style classes 210, a matrix K represents a concatenation of the $n_e$ routing (key) vectors ($R_1$-$R_n$) 210$a$-$n$, and a matrix E encompasses all the $n_e$ value vectors ($V_1$-$V_n$) 220$a$-$n$. For evaluation (test) ad-vectors 200E, the routing vectors 210 correspond to queries, $n_t$ denotes the number of style classes 210, a matrix Q represents a concatenation of the $n_t$ routing (key) vectors ($R_1$-$R_n$) 210$a$-$n$, and a matrix T encompasses all the $n_t$ value vectors ($V_1$-$V_n$) 220$a$-$n$. As described in greater detail below, the number of style classes $n_t$, $n_e$ can be potentially different.

The respective value vector 220 of each style class 202 of then style classes contains respective speaker-related information (e.g., speaker-related phonetic components such as vowels, consonants, and/or fricatives. The respective routing vector 210 of each style class 202 includes environmental, channel, and/or contextual information associated with the captured utterance the respective ad-vector 200 was extracted from. The routing vectors 210 are configured to identify matching conditions between an utterance associated with an evaluation ad-vector 200E and at least one reference utterance (e.g., enrollment utterance) associated with a reference ad-vector 200R to allow the soft-attention mechanism 160 to condition the reference ad-vector 200R to the ad-vector 200E when computing the MCAS 165. In one example, the routing vectors 210 could weight value vectors 220 when the evaluation and reference ad-vectors are both derived from utterances captured by a same type of user device and/or user devices executing the same type of operating system.

In some examples, the ad-vector 200 is a text-dependent ad-vector 200 extracted from audio data characterizing one or more particular terms, such as, for example, a predefined hotword. For instance, the evaluation ad-vector 200E may be extracted from the portion of the audio data 120 that characterizes the predetermined hotword "Hey Google" spoken by the user. Likewise, each reference ad-vector 200R may be extracted from a portion of one or more enrollment utterances spoken by the respective enrolled user 10 that characterizes the same predetermined hotword "Hey Google". That is, each reference ad-vector corresponds to a voiceprint or unique identifier representing characteristics of the voice of the respective enrolled user 10 speaking the predetermined hotword.

In other examples, the ad-vector 200 is a text-independent ad-vector that is generated from an utterance independent of the terms/text spoken in the utterance. For instance, a text-independent evaluation ad-vector 200E may be extracted from the query portion of the audio data 120 that characterizes the query "Play my music playlist" spoken by the user. The hotword portion of the audio data 120 may further contribute to the text-independent evaluation ad-vector 200E such that the evaluation ad-vector 200E represents voice characteristics of the entire utterance 119. Likewise, a text-independent reference ad-vector 200R may be generated from one or more enrollment utterances spoken by the respective enrolled user 10 during a voice enrollment process. The text-independent reference ad-vector 200R may correspond to a voiceprint or unique identifier representing characteristics of the voice of the respective enrolled user independent of the text/terms spoken in the enrollment utterances.

Notably, the ad-vector 200 may also be configured to represent both text-independent and text-dependent speaker-related information. For example, the SID model 150 may learn to generate an ad-vector with n style classes 202 whereby at least one of the style classes 202 is dependent on a fixed term or phrase such that the respective value vector 220 in this style class includes speaker-related information representative of voice characteristics of the spoken fixed term or phrase. For instance, the fixed term or phrase may include a predefined hotword. During training, training utterances used to train the SID model 150 may include a portion characterizing the fixed term or phrase such that the SID model 150 learns to depend at least one of the n style classes 210 on the fixed term or phrase.

The use of ad-vectors 200 is not limited to speaker identification tasks, and may be employed in other technologies where evaluation embeddings are compared to reference embeddings. For instance, ad-vectors 200 may be used in image-based tasks such as face identification where an evaluation ad-vector 200E includes n style classes 202 with corresponding value vectors 220 each representing respective facial feature-related information extracted from an image of an individual's face is compared to a reference ad-vector 200R to determine whether or not a facial identification match is made by computing a similarity score (e.g., MCAS) between the evaluation and reference ad-vectors 200E, 200R.

Referring back to FIG. 1, in some implementations, each enrolled user 10 of the user device 102 has permissions for accessing a different respective set of personal resources, where performance of a query characterized by a portion of the audio data 120 requires access to the respective set of personal resources associated with the enrolled user 10 identified as the speaker of the utterance 119. Here, each enrolled user 10 of the user device 102 may undertake a voice enrollment process to obtain respective enrolled user reference ad-vectors 200R from audio samples of multiple enrollment phrases spoken by the enrolled user 10. One or more of the enrolled users 10 may use the user device 102 to conduct the voice enrollment process, where the microphone 106 captures the audio samples of these users speaking the enrollment utterances and the SID model 150 generates the respective reference ad-vectors 200R. Additionally, one or more of the enrolled users 10 may enroll with the user device 102 by providing authorization and authentication credentials to an existing user account with the user device 102. Here, the existing user account may store a reference ad-vector 200E obtained from a previous voice enrollment process conducted by a respective user with another device also linked to the user account.

The reference ad-vectors 200R are not limited to being obtained from the enrolled users 10 explicitly undertaking an enrollment process and in which the users 10 are prompted to speak predefined enrollment phrases. For instance, a reference ad-vector 200R may be extracted from one or more audio samples of the respective enrolled user 10 speaking a predetermined term such as the hotword (e.g., "Ok Google" or "Hey Google") used for invoking the user device to wake up from a sleep state during previous interactions with the user device 102 or another user device 102 linked to an existing user account. Similarly, the reference ad-vector 200R for an enrolled user 10 may be obtained from one or more audio samples of the respective enrolled user 10 speaking phrases with different terms/words and of different lengths. For instance, the reference ad-vector 200R may be obtained over time from audio samples obtained from speech interactions the user 10 has with the user device 102 or other devices linked to the same account. In other words, the reference ad-vector 200R may be generated by the SID model 140 in response to receiving one or more previous utterances spoken by the enrolled user 10 of the user device 102 and/or other devices linked to the same account. In some examples, an enrolled user 10 uses one user device to capture a first set of one or enrollment utterances and then uses another user device to capture a second set of one or more enrollment utterances.

Figure 2B:
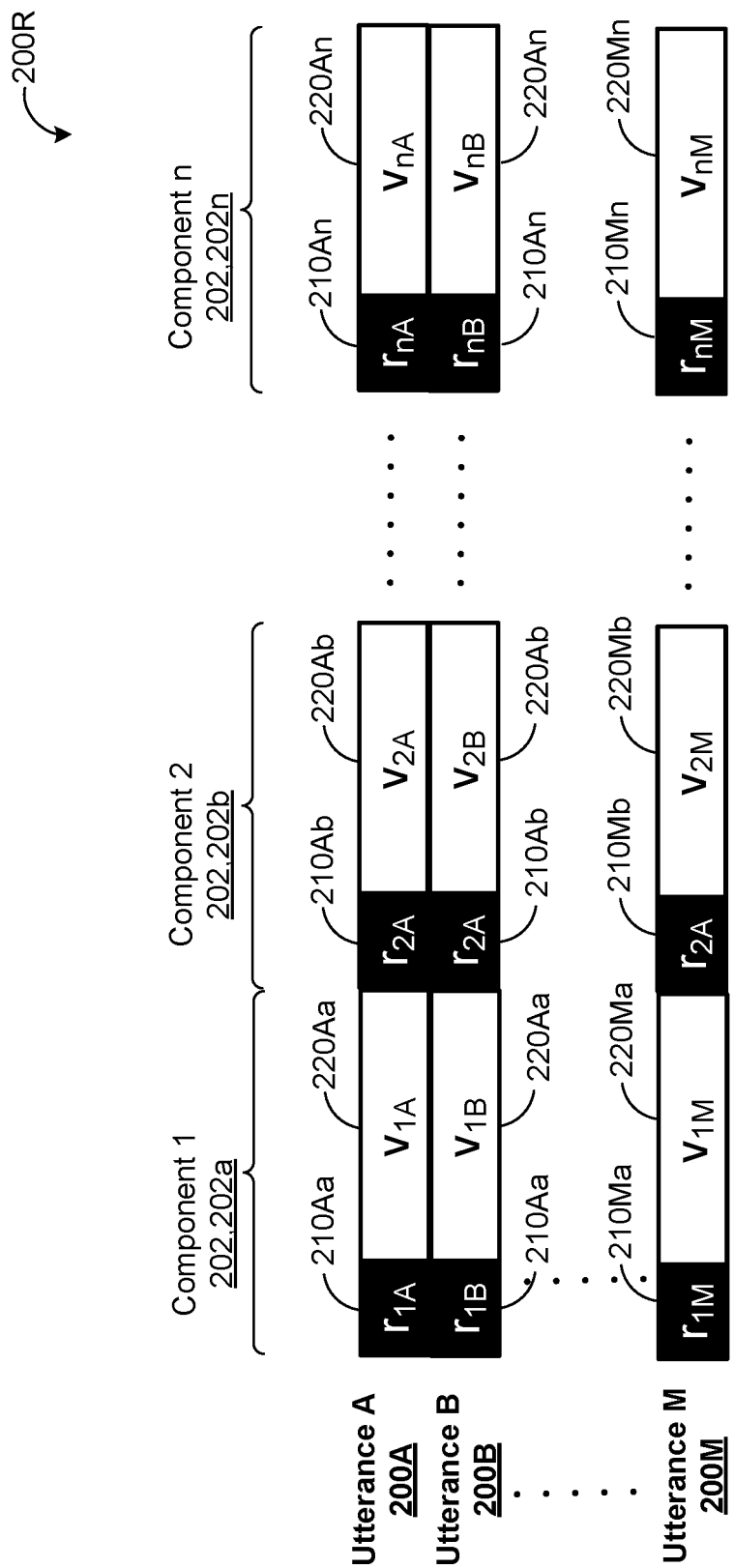
FIG. 2B is a schematic view of a reference attentive d-vector concatenating multiple attentive d-vectors derived from multiple enrollment utterances spoken by a same speaker.

By contrast to conventional reference d-vectors which are not of the attentive type and are representative of an average of the speaker-related information extracted multiple enrollment phrases spoken by a particular speaker, FIG. 2B shows that the reference ad-vector 200R generated for each respective enrolled user can include a concatenation of multiple ad-vectors 200A-M each generated from a respective one of multiple M enrollment utterances A-M (or other previous utterances obtained from previous interactions) spoken by the enrolled user. Here, each individual one of the multiple ad-vectors includes respective n style classes 202, 202$a$-$n$ each including a respective value vector 220, 220A$a$-220M$n$ concatenated with a corresponding routing vector 210A$a$-M$n$. Each style class 202 may be interchangeably referred to as a "component class", such that 202$a$ denotes a first component class, 202$b$ denotes a second component class, . . . , and 202$n$ denotes an $n^{th}$ component class. Accordingly, the reference ad-vector 200R combines a superset of style classes 202 from all of the enrollment utterances A-M by concatenating the multiple ad-vectors into a single, much larger reference ad-vector 200R with M×n style classes. For each enrollment utterance from the respective enrolled speaker, a respective matrix $K_i$ may be generated that represents a concatenation of the n routing vectors and a respective matrix E may be generated that encompasses the n value vectors for the n style classes. Accordingly, the concatenation of the multiple ad-vectors 200A-M into the single, much longer reference ad-vector R with M×n components may be expressed as follows.

$$\tilde{K} = [K_1 \ldots K_m] \in R[m^*n_e, d_r] \qquad (1)$$

$$\tilde{E} = [E_1 \ldots E_m] \in R[m^*n_e, d_r] \qquad (2)$$

As such, the reference ad-vector 200R may include $n_e$ style classes while the evaluation ad-vector 200E includes less $n_t$ style classes. Notably, the reference ad-vector 200R including the $n_e$ style classes 210 retains all the speaker-related information extracted from the multiple M enrollment utterances, and as will be described in greater detail below, the soft-attention mechanism 160 is conditioned on both the evaluation ad-vector 200E having $n_t$ style classes 210 and the reference ad-vector 200R having the greater number of $n_e$ style classes 210 when applying the attentive scoring function to compute the MCAS 165. As such, the reference ad-vector 200R permits the combining of multiple enrollment utterances by combining the superset of n components from all the ad-vectors 200R into the reference ad-vector 200R such that the reference ad-vector 200R is not representative of an average of the individual ad-vectors.

Referring to FIGS. 1, 2A, and 2B, in some implementations, the soft-attention mechanism 160 applies the attentive scoring function for computing the MCAS scores 165 by providing a soft alignment among the $n_t$ value vectors 220 in the evaluation ad-vector 200E and the $n_r$ value vectors 210 in the reference ad-vector 200R that is conditioned to the utterance 119 and the enrollment utterances. Simply put, the attentive scoring function may define a process of generating a single similarity number, i.e., the MCAS 165, from two independent ad-vectors 200, i.e., the evaluation and reference ad-vectors 200E, 200R. While examples below describe particular implementations of the soft-attention mechanism 160 computing MCAS 165, the soft-attention mechanism 160 is not limited to computing MCAS 165 and may compute other types of metrics/scores for indicating similarity between the evaluation ad-vector 200E and respective ones of one or more reference ad-vectors 200, 200R$a$-R$n$. As the soft-attention mechanism 160 closely resembles the attention mechanism similar to what is used by a Transformer, the soft-attention mechanism 160 may compute the MCAS as follows:

$$mcas(T, E, K, Q) = tr\left(TE \operatorname{softmax}\left(\frac{KQ}{\sqrt{d_r^p}}\right)\right) \qquad (3)$$

$$\alpha = \operatorname{softmax}\left(\frac{KQ}{\sqrt{d_r^p}}\right) \in R[n_e, n_t] \qquad (4)$$

where Equation (4) represents the classical equation for attention weights $\alpha$, similar to what is used in a Transformer, that includes a matrix with values between 0 and 1 to provide the soft alignment among the evaluation and reference value vectors 220. That is, the attention weights $\alpha$ are fully defined the matrix K, representing the concatenation of the $n_e$ routing (key) vectors 210, and the matrix Q, representing the concatenation of the $n_t$ routing (query) vectors 210. The denominator $$\sqrt{d_r^p}$$

in Equation (4) is a constant and controls how much the sofmax is comparable to an arg_max operation according to a hyperparameter P. In the attention weight matrix represented by Equation (4), each column among $n_t$ columns goes over its own softmax transformation. In Equation (4), the operation $tr(T\ E'\ \alpha) \in R$ access $n_e$ weights from the attention weight matrix $\alpha$ and an inner product is computed between each value vector 220 in the evaluation ad-vector 200E and the $\alpha$-weighted average of the matrix E which represents the concatenation of the $n_t$ value vectors 220 in the evaluation ad-vector 200E. This process repeats for each of the remaining value vectors 220 among the $n_t$ value vectors 220 in the evaluation ad-vector 200E where the results are summed to provide the final MCAS 165 via the trace tr operation.

Notably, the soft-attention mechanism 160 using Equation 3 to compute the MCAS 165 results in different weight matrices $\alpha$ for different keys and value vectors. In other words, the weights of the attention mechanism 160 are conditioned to the input ad-vectors 200E, 200R, thereby permitting the weighted average of the reference value vectors 220 in the reference ad-vector 200R to be conditioned on both the evaluation (test) and reference (evaluation) utterances that the respective evaluation and reference ad-vectors 200E, 200R were extracted from. Thus, when generating each MCAS 165, the self-attention mechanism 160 is conditioned on both the input evaluation and reference ad-vectors 200E, 200R and the reference ad-vector 200R is conditioned to the evaluation ad-vector 200E.

Additionally, as the number "n" of style classes 202 represented by the ad-vectors 200 is arbitrary, the MCAS is well-suited to model multivariate distributions on the vector space of v which is not possible using conventional cosine distance scoring. The attentive scoring function when computing the MCAS doesn't require additional parameters that could be somehow described as being part of a Siamese topology, which is optimal for production releases of the SID system 150 in a distributed system.

With continued reference to FIG. 1, the verifier 170 of the SID system 140 is configured to receive each MCAS 165 output from the soft-attention mechanism 160 and identify the speaker of the utterance 119 as the respective enrolled user 10 that is associated with the respective reference ad-vector 200R corresponding to the greatest MCAS 165. In some examples, the verifier 170 compares each MCAS 165 to a threshold score such that the speaker of the utterance 119 is only identified as one of the respective enrolled users 10 when the respective reference ad-vector 200R associated with that user 10 satisfies the threshold score. Each MCAS 165 may include a value within a range of values between and including −1.0 to 1.0, whereby an MCAS 165 equal to 1.0 is indicative of a perfect match between the evaluation and reference ad-vectors 200E, 200R.

In the example shown, when the verifier 170 identifies the speaker of the utterance 119, the verifier 170 may provide a SID confirmation 175 to the ASR system 180 that identifies the speaker of the utterance 119 as the respective enrolled user 10 associated with the MCAS 165 that satisfied the confidence threshold. The SID confirmation 175, when received by the ASR system 180, may instruct the ASR system 180 to initiate performance of the action specified by the query. In the example shown, the ASR system 180 may include an ASR model (not shown) that configured to perform speech recognition on the audio data 120 that characterizes the query. The ASR system 180 may also includes a natural language understanding (NLU) module configured to perform query interpretation on the speech recognition result output by the ASR model. Generally, the NLU module may perform semantic analysis on the speech recognition result to identify the action to perform that is specified by the query. In the example shown, the NLU module may determine that performance of the action specified by the query "Play my music playlist", requires access to a respective set of personal resources associated with a respective enrolled user 10 of the user device 102. Thus, the NLU module determines that the action specified by the query is missing a necessary parameter, i.e., the identity of the user, needed to perform the action. Accordingly, the NLU module uses the SID confirmation 175 identifying a particular enrolled user (e.g., John) 10a as the speaker of the utterance 119, and therefore initiates fulfillment of the query by providing an output instruction 185 to perform the action specified by the query. In the example shown, the output instruction 185 may instruct a music streaming service to stream a music track from the enrolled user John's music playlist. The digital assistant interface may provide the response 190 to the query that includes the music track for audible output from the user device 102 and/or one or more other devices in communication with the user device 102.

Figure 3:
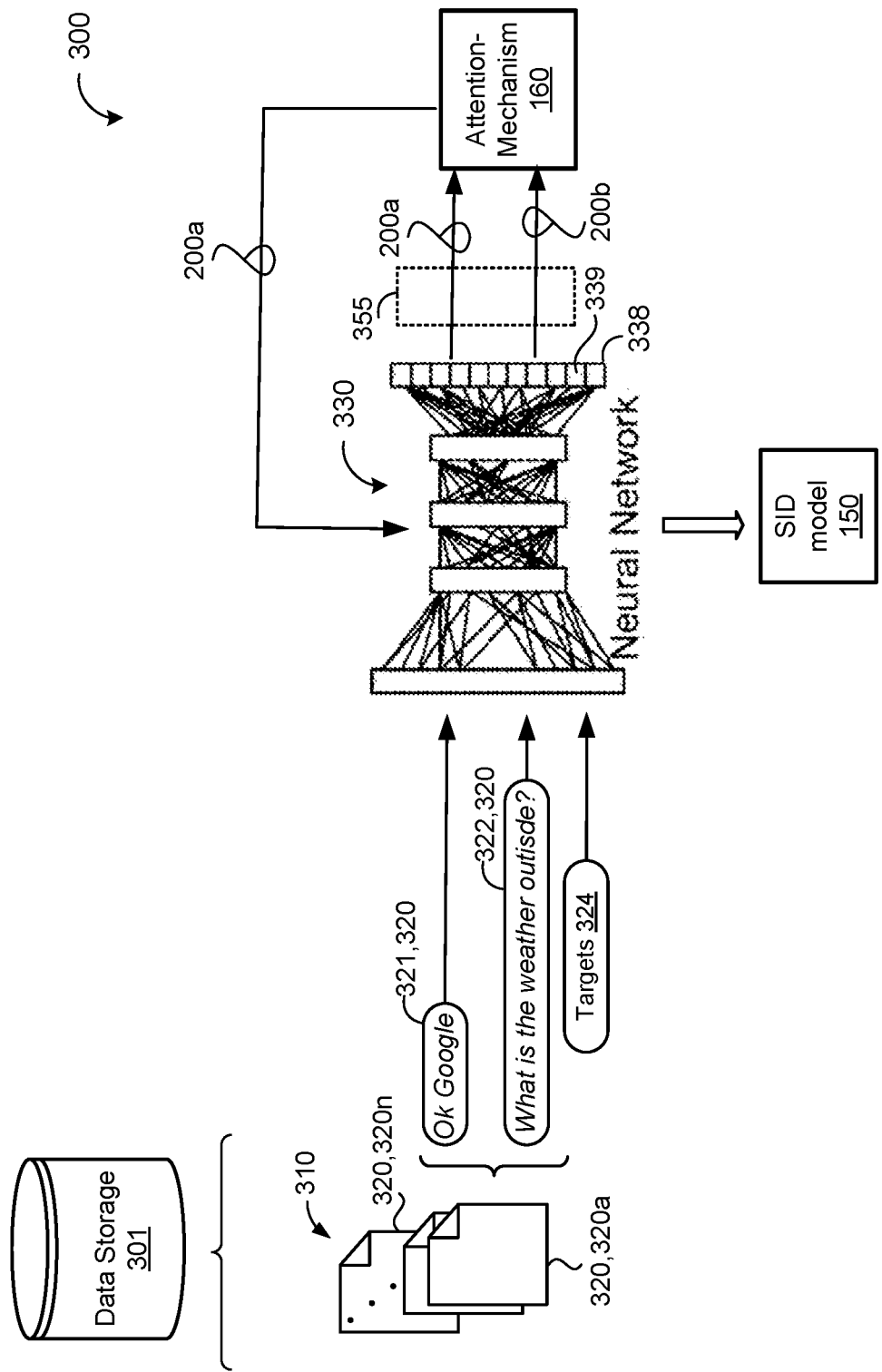
FIG. 3 is a schematic view of an example training process for training the speaker verification system of FIG. 1.

FIG. 3 shows an example SID training process 300 for training the SID system 140. The training process 300 may execute on the remote system 111 of FIG. 1. The training process 300 obtains one or more training data sets 310 stored in data storage 301 and trains the SID model 150 on the training data sets 310. The data storage 301 may reside on the memory hardware 113 of the remote system 111. Each training data set 310 includes a plurality of training utterances 320, 320a-n spoken by different speakers. Each corresponding training utterance 320 may include a text-dependent portion 321 and a text-independent portion 322. The text-dependent portion 321 includes an audio segment characterizing a predetermined word (e.g., "Hey Google") or a variant of the predetermined hotword (e.g., "Ok Google") spoken in the training utterance 320. In additional implementations, the text-dependent portion 321 in some training utterances 320 includes audio segments characterizing other terms/phrases lieu of the predetermined word or variant thereof, such as custom hotwords or commonly used voice commands (e.g., play, pause, volume up/down, call, message, navigate/directions to, etc.). The text-dependent portion 321 is optional such that only a portion of the training utterances 320 may include the text-dependent portion or none of the training utterances 320 may include the text-dependent portion 321.

The text-independent portion 322 in each training utterance 320 includes an audio segment that characterizes a query statement spoken in the training utterance 320 following the predetermined word characterized by the text-dependent portion 321. For instance, the corresponding training utterance 320 may include "Ok Google, What is the weather outside?" whereby the text-dependent portion 321 characterizes the predetermined "Ok Google" and the text-independent portion 322 characterizes the query statement "What is the weather outside". While the text-dependent portions 321 in each training utterance 320 is phonetically constrained by the same predetermined word or variation thereof, the lexicon of the query statement characterized by each text-independent portion 322 is not constrained such that the duration and phonemes associated with each query statement is variable.

With continued reference to FIG. 3, the training process 300 trains a neural network 330 on the training utterances 320, 320a-n to generate a respective ad-vector 200 for each utterance 320. During training, additional information about each utterance 320 may be provided as input to the neural network 330. For instance, SID targets 324, such as SID target vectors, corresponding to ground-truth output labels for training the SID model 150 to learn how to predict may be provided as input to the neural network 330 during training with the utterances 329. Thus, one or more utterances 320 from each particular speaker may be paired with a particular SID target vector 324.

The neural network 330 may include a deep neural network including an input layer for inputting the training utterances 320, multiple hidden layers for processing the training utterances, and an output layer 338. In some examples, the neural network 330 generates an ad-vector 200 directly from an input training utterance 320 received by the neural network 330. In these examples, each respective set among n sets of output nodes 339 of the output layer 338 is designated to generate a respective one of the n style classes 202 for each input training utterance 320. That is the number of n sets of output nodes 339 may be equal to the n number of style classes specified for the ad-vectors 200. That is, each respective set of output nodes 339 is configured to generate a respective value vector 220 specific to the respective style class that is also concatenated with a corresponding routing vector 210 specific to the style class. Stated differently, each set of output nodes in the n multiple sets of output nodes of the output layer 338 is designated to learn to generate speaker-related information specific to the respective style class 202 of the ad-vector 200. As mentioned previously, at least one style class may be dependent on a fixed term or phrase, such as the text-dependent portion 321 of a training utterance. Employing the neural network 330 to generate the ad-vectors 200 as output from the output layer 338 may require enlarging the output layer 338 to include a greater number of output nodes 339 compared to if the output layer 338 were generating a conventional d-vector of the non-attentive type.

In other examples, a set of linear and non-linear transformations 355 is applied to the output of the neural network 330 to generate the ad-vector 200. In these examples, the neural network 300 generates, as output from the output layer 338, a conventional non-attentive d-vector and the set of linear and non-linear transformatinos 355 is applied to transform the non-attentive d-vector into the ad-vector 200 representing the concatenation of the n style classes. For instance, using $x \in R^a$ to represent the non-attentive d-vector with a dimensions, the matrices K, Q, E, T may be computed as follows to transform the non-attentive d-vector into the ad-vector 200:

$$K = W^K x \text{ where } W^K \in R[n_e, d_r, a] \quad (5)$$

$$Q = W^Q x \text{ where } W^Q \in R[n_r, d_r, a] \quad (6)$$

$$E = g(W^E x) \text{ where } W^E \in R[n_v, d_v, a] \quad (7)$$

$$T = g(W^T x) \text{ where } W^T \in R[n_r, d_v, a] \quad (8)$$

where g( ) is a transformation function, typically and L2 normalization required to make the training process stable. With respect to the K and Q matrices, the function go is not needed since the softmax function in Equation (4) already performs the scale normalization.

Training of the SID model 150 may begin by providing sequence of training utterances 320 to the neural network 330. In some examples, the neural network 330 is trained using a pair-wise training technique in which a first training utterance 320a paired with a particular SID target vector 324 is input to the neural network 330 and processed to generate a respective first ad-vector 200a. Subsequently, a second training utterance 320 paired with a particular SID target vector is input to the neural network 330 and processed to generate a respective second as-vector 200b. The soft-attention mechanism 160 then compares the first and second ad-vectors 200a, 200b to determine whether or not the first and second ad-vectors 200a, 200b were derived from training utterances 320a, 320b that were uttered by the same speaker. As described above, the soft attention mechanism 160 may compute an MCAS 165 indicating a likelihood that the first and second ad-vectors 200a, 200b match one another. The MCAS 165 output from the soft-attention mechanism 160 provides an indication of whether the training utterances 320a, 320b were spoken by the same speaker. In one example, the MCAS 165 may simply include a binary value of '0' or a '1' in which the '0' indicates the utterance were spoken by different speakers and the '1' indicates the utterances were spoken by the same speaker. The parameters of the neural network 330 may then be adjusted based on the MCAS 165. Multiple sets of training data may be processed in this manner. Once the SID model 150 is trained, the remote system 111 may transmit a copy of the SID model 150 through the network 104 to one or more respective user devices such as user device 102. The trained SID model 150 may optionally execute on the remote system 111.

Figure 4:
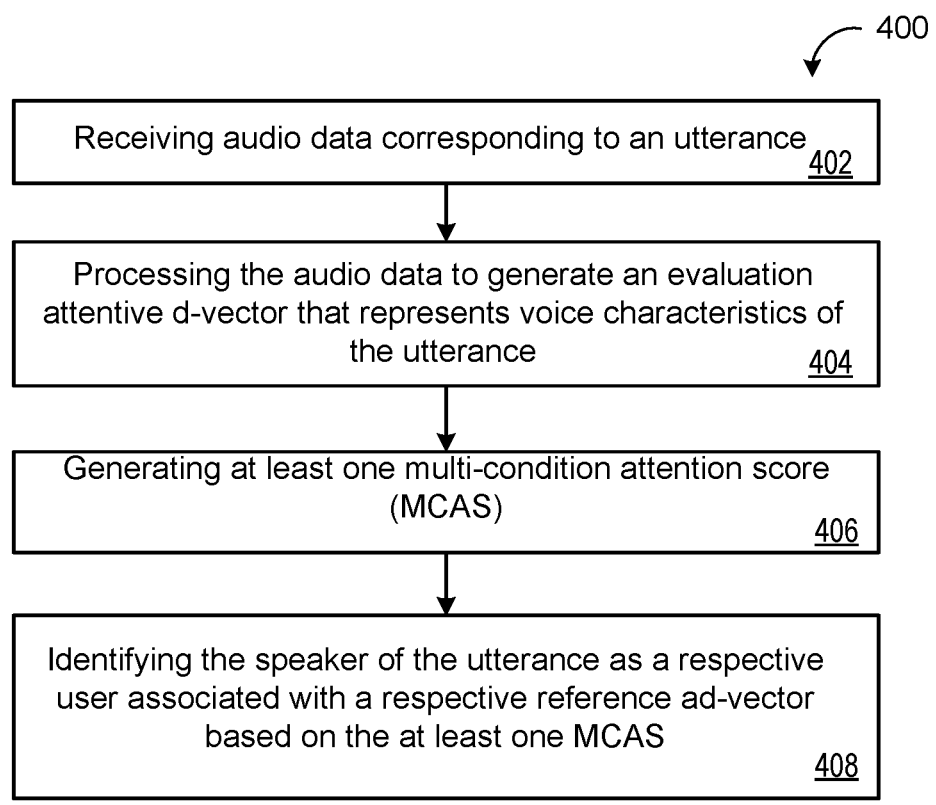
FIG. 4 is a flowchart of an example arrangement of operations for a method of for speaker verification using the speaker verification system of FIG. 1.

FIG. 4 includes a flowchart of an example arrangement of operations for a method 400 of speaker identification. At operation 402, the method 400 includes receiving audio data 120 corresponding to an utterance 119 captured by a user device 102. At operation 404, the method 400 includes processing, using a speaker identification model 150, the audio data 120 to generate an evaluation attentive d-vector (ad-vector) 200E that represents voice characteristics of the utterance 119. The evaluation ad-vector 200E includes $n_e$ style classes 202 each including a respective value vector 220 concatenated with a corresponding routing vector 210.

At operation 406, the method 400 includes generating at least one multi-condition attention score (MCAS) 165 that indicates a likelihood that the evaluation ad-vector 200E matches a respective reference ad-vector 200R. The reference ad-vector 200R includes $n_r$ style classes 202 each including a respective value vector 220 concatenated with a corresponding routing vector 210. At operation 408, the method 400 includes identifying the speaker of the utterance 119 as the respective user 10 associated with the respective reference ad-vector 200R based on the at least one MCAS 165.

Figure 5:
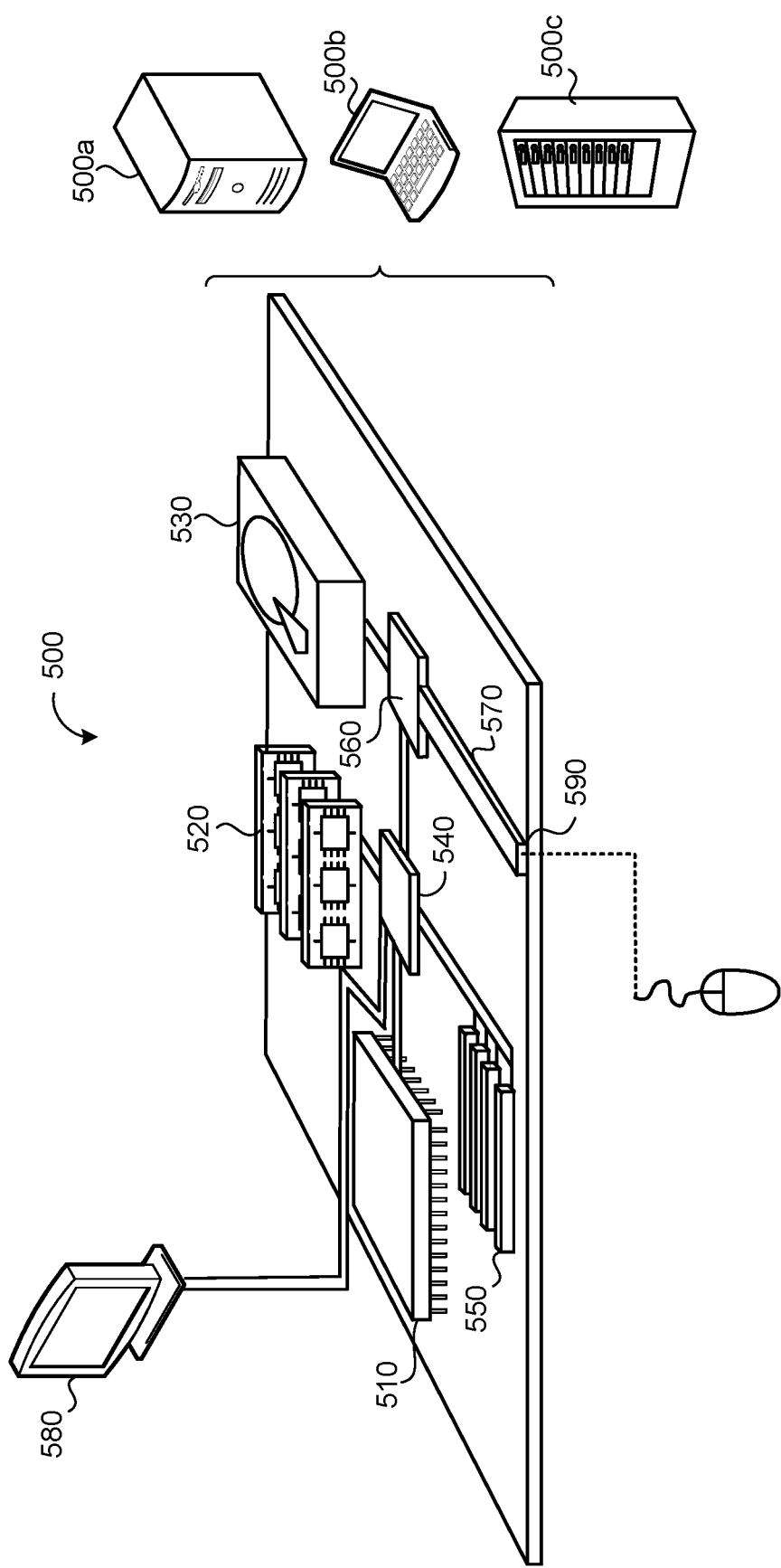
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method for speaker identification executed on data processing hardware that causes the data processing hardware to perform operations comprising:
    receiving audio data corresponding to an utterance captured by a user device;
    processing, using a speaker identification model, the audio data to generate an evaluation attentive d-vector (ad-vector) representing voice characteristics of the utterance, the evaluation ad-vector comprising $n_e$ style classes each comprising a respective value vector concatenated with a first corresponding routing vector, the first corresponding routing vector comprising environmental or channel information associated with the audio data the evaluation ad-vector was generated from;
    generating, using a self-attention mechanism, at least one multi-condition attention score that indicates a likelihood that the evaluation ad-vector matches a respective reference ad-vector associated with a respective user, the reference ad-vector comprising $n_r$ style classes each comprising a respective value vector concatenated with a second corresponding routing vector, the second corresponding routing vector comprising environmental or channel information associated with a respective utterance the reference ad-vector was extracted from; and
    identifying the speaker of the utterance as the respective user associated with the respective reference ad-vector based on the multi-condition attention score.

2. The computer-implemented method of claim 1, wherein identifying the speaker of the utterance comprises:
    determining whether the multi-condition attention score satisfies a threshold score; and
    when the multi-condition attention score satisfies the threshold score, determining that the speaker of the utterance includes the respective user associated with the respective reference ad-vector.

3. The computer-implemented method of claim 1, wherein each value vector comprises a same first dimensionality and each routing vector comprises a same second dimensionality that is less than the first dimensionality of each value vector.

4. The computer-implemented method of claim 3, wherein a size of the second dimensionality is one-third a size of the first dimensionality.

5. The computer-implemented method of claim 1, wherein:
    the respective value vector of each style class of the n style classes in each one of the evaluation ad-vector and the reference ad-vector contains respective speaker-related information.

6. The computer-implemented method of claim 1, wherein the first and second corresponding routing vectors are configured to identify matching conditions between the utterance associated with the evaluation ad-vector and at least one reference utterance associated with the reference ad-vector.

7. The computer-implemented method of claim 1, wherein:
    generating the at least one multi-condition attention score comprises using the self-attention mechanisms to generate multiple multi-condition attention scores each indicating a respective likelihood that the evaluation ad-vector matches a respective one of multiple reference ad-vectors, each reference ad-vector is associated with a respective one of one or more enrolled users of the user device; and
    identifying the speaker of the utterance comprises identifying the speaker of the utterance as the respective enrolled user of the user device that is associated with the respective reference ad-vector corresponding to the greatest multi-condition attention score.

8. The computer-implemented method of claim 7, wherein:
    the utterance captured by the user device comprises a query specifying an action to perform;
    each of the one or more enrolled users of the user device has permissions for accessing a respective set of personal resources; and
    performance of the action specified by the query requires access to the respective set of personal resources associated with the respective enrolled user identified as the speaker of the utterance.

9. The computer-implemented method of claim 1, wherein:
    the speaker identification model comprises a neural network having an input layer, a plurality of hidden layers, and an output layer comprising multiple sets of output nodes, each set of output nodes in the n sets of output nodes of the output layer designated to learn to generate speaker-related information specific to a respective one of the n style classes; and processing the audio data to generate the evaluation ad-vector comprises using the neural network to process the audio data to generate each of the n style classes for the evaluation ad-vector as output from the respective set of output nodes of the output layer that is designated to learn to generate the speaker-related information specific to the respective style class.

10. The computer-implemented method of claim 1, wherein processing the audio data to generate the reference ad-vector comprises:
generating, as output from the speaker identification model comprising a neural network, a non-attentive d-vector representing voice characteristics of the utterance; and
applying a set of linear and non-linear transformations to transform the non-attentive d-vector into the reference ad-vector.

11. The computer-implemented method of claim 1, wherein the reference ad-vector is generated by the speaker identification model in response to receiving one or more previous utterances spoken by the respective user.

12. The computer-implemented method of claim 1, wherein the reference ad-vector is generated by:
receiving, as input to the speaker identification model, m enrollment utterances spoken by the respective user;
for each enrollment utterance of the m enrollment utterances, generating, as output from the speaker identification model, a respective enrollment ad-vector having $n_e$ style classes; and
combining a superset of the $n_e$ style classes of the enrollment ad-vectors generated as output from the speaker identification model for the m enrollment utterances into the reference ad-vector.

13. The computer-implemented method of claim 12, wherein, when generating the at least one multi-condition attention score that indicates the likelihood that the evaluation ad-vector matches the respective reference ad-vector associated with the respective user, the self-attention mechanism automatically aligns the style classes among the evaluation ad-vector and the multiple reference ad-vectors.

14. The computer-implemented method of claim 1, wherein at least one style class of the $n_r$ and $n_e$ style classes is dependent on a fixed term or phrase.

15. The computer-implemented method of claim 1, wherein the data processing hardware:
executes both the speaker identification model and the self-attention mechanism; and
resides on one of the user device or a distributed computing system in communication with the user device via a network.

16. A system comprising:
data processing hardware; and
memory hardware in communication with the data processing hardware, the memory hardware storing instructions that, when executed on the data processing hardware, cause the data processing hardware to perform operations comprising:
receiving audio data corresponding to an utterance captured by a user device;
processing, using a speaker identification model, the audio data to generate an evaluation attentive d-vector (ad-vector) representing voice characteristics of the utterance, the evaluation ad-vector comprising $n_e$ style classes each comprising a respective value vector concatenated with a first corresponding routing vector, the first corresponding routing vector comprising environmental or channel information associated with the audio data the evaluation ad-vector was generated from;
generating, using a self-attention mechanism, at least one multi-condition attention score that indicates a likelihood that the evaluation ad-vector matches a respective reference ad-vector associated with a respective user, the reference ad-vector comprising $n_r$ style classes each comprising a respective value vector concatenated with a second corresponding routing vector, the second corresponding routing vector comprising environmental or channel information associated with a respective utterance the reference ad-vector was extracted from; and
identifying the speaker of the utterance as the respective user associated with the respective reference ad-vector based on the multi-condition attention score.

17. The system of claim 16, wherein identifying the speaker of the utterance comprises:
determining whether the multi-condition attention score satisfies a threshold score; and
when the multi-condition attention score satisfies the threshold score, determining that the speaker of the utterance includes the respective user associated with the respective reference ad-vector.

18. The system of claim 16, wherein each value vector comprises a same first dimensionality and each routing vector comprises a same second dimensionality that is less than the first dimensionality of each value vector.

19. The system of claim 18, wherein a size of the second dimensionality is one-third a size of the first dimensionality.

20. The system of claim 16, wherein:
the respective value vector of each style class of the n style classes in each one of the evaluation ad-vector and the reference ad-vector contains respective speaker-related information.

21. The system of claim 16, wherein the first and second corresponding routing vectors are configured to identify matching conditions between the utterance associated with the evaluation ad-vector and at least one reference utterance associated with the reference ad-vector.

22. The system of claim 16, wherein:
generating the at least one multi-condition attention score comprises using the self-attention mechanisms to generate multiple multi-condition attention scores each indicating a respective likelihood that the evaluation ad-vector matches a respective one of multiple reference ad-vectors, each reference ad-vector is associated with a respective one of one or more enrolled users of the user device; and
identifying the speaker of the utterance comprises identifying the speaker of the utterance as the respective enrolled user of the user device that is associated with the respective reference ad-vector corresponding to the greatest multi-condition attention score.

23. The system of claim 22, wherein:
the utterance captured by the user device comprises a query specifying an action to perform;
each of the one or more enrolled users of the user device has permissions for accessing a respective set of personal resources; and
performance of the action specified by the query requires access to the respective set of personal resources associated with the respective enrolled user identified as the speaker of the utterance.

24. The system of claim 16, wherein:
the speaker identification model comprises a neural network having an input layer, a plurality of hidden layers, and an output layer comprising multiple sets of output nodes, each set of output nodes in the n sets of output nodes of the output layer designated to learn to generate speaker-related information specific to a respective one of the n style classes; and
processing the audio data to generate the evaluation ad-vector comprises using the neural network to process the audio data to generate each of the n style classes for the evaluation ad-vector as output from the respective set of output nodes of the output layer that is designated to learn to generate the speaker-related information specific to the respective style class.

25. The system of claim 16, wherein processing the audio data to generate the reference ad-vector comprises:
generating, as output from the speaker identification model comprising a neural network, a non-attentive d-vector representing voice characteristics of the utterance; and
applying a set of linear and non-linear transformations to transform the non-attentive d-vector into the reference ad-vector.

26. The system of claim 16, wherein the reference ad-vector is generated by the speaker identification model in response to receiving one or more previous utterances spoken by the respective user.

27. The system of claim 16, wherein the reference ad-vector is generated by:
receiving, as input to the speaker identification model, m enrollment utterances spoken by the respective user;
for each enrollment utterance of the m enrollment utterances, generating, as output from the speaker identification model, a respective enrollment ad-vector having $n_e$ style classes; and
combining a superset of the $n_e$ style classes of the enrollment ad-vectors generated as output from the speaker identification model for the m enrollment utterances into the reference ad-vector.

28. The system of claim 27, wherein, when generating the at least one multi-condition attention score that indicates the likelihood that the evaluation ad-vector matches the respective reference ad-vector associated with the respective user, the self-attention mechanism automatically aligns the style classes among the evaluation ad-vector and the multiple reference ad-vectors.

29. The system of claim 16, wherein at least one style class of the $n_r$ and $n_e$ style classes is dependent on a fixed term or phrase.

30. The system claim 16, wherein the data processing hardware:
executes both the speaker identification model and the self-attention mechanism; and
resides on one of the user device or a distributed computing system in communication with the user device via a network.

* * * * *